No. 700,788. Patented May 27, 1902.
E. D. LEVITT & J. W. POLCHOW.
KEYLESS PIN OR BOLT.
(Application filed Jan. 25, 1902.)
(No Model.)
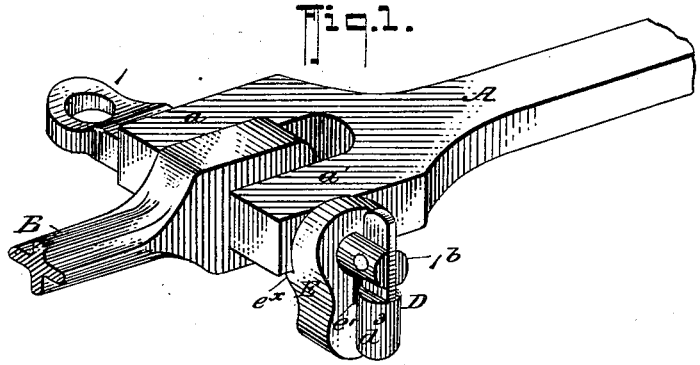
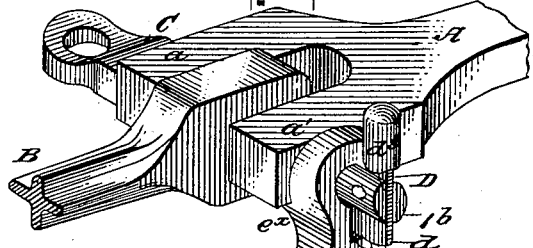
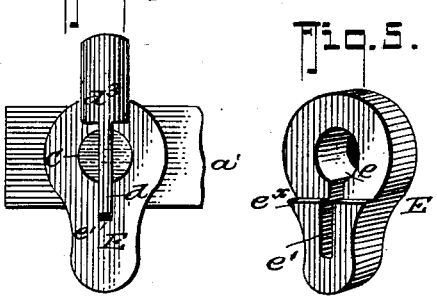
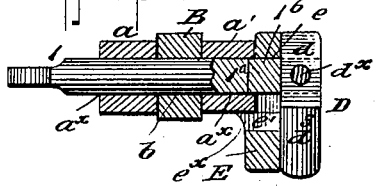
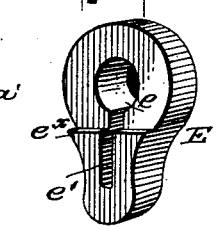
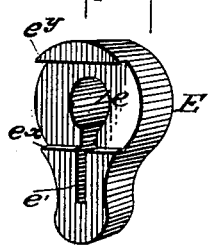
WITNESSES:
INVENTORS
E. D. LEVITT
J. W. POLCHOW
BY
Fred G. Dieterich & Co.
ATTORNEYS

UNITED STATES PATENT OFFICE.

EDWIN D. LEVITT, OF MONTICELLO, WISCONSIN, AND JOHN W. POLCHOW, OF APPLE RIVER, ILLINOIS.

KEYLESS PIN OR BOLT.

SPECIFICATION forming part of Letters Patent No. 700,788, dated May 27, 1902.

Application filed January 25, 1902. Serial No. 91,262. (No model.)

*To all whom it may concern:*

Be it known that we, EDWIN DENT LEVITT, of Monticello, Wisconsin, and JOHN W. POLCHOW, residing at Apple River, in the county of Jo Daviess and State of Illinois, have invented a new and Improved Keyless Pin or Bolt, of which the following is a specification.

Our invention relates to that class of pins or bolts having a pivoted portion in its outer or penetrating end adapted to gravitate at right angles to the shank or body portion and form a locking member for holding the pin or bolt from working lengthwise and out of its bearings or seat.

In keyless bolts or pins of the kind stated the bolt or shank of necessity is of such length as to provide for sufficient projection of said shank to permit the pivoted member or latch being swung up into a longitudinal plane with the shank to form, as it were, an extension of the shank to permit the ready withdrawal of the bolt or pin. This correlative projection of the shank with the pivoted latch necessitates a certain loose longitudinal play of the bolt. This has been found objectionable, especially where the pin or bolt is used in a movable connection—for example, in pitman-rods, &c.—as the momentum of the parts frequently swings the latch up into alinement with the bolt, and thereby leaves the bolt in a position to freely drop out of its seat or bearing. Means have heretofore been provided for coöperating with the object to which the bolt or pin is applied the bolt and the latch member for taking up the lost motion mentioned—such, for example, as springs interposed between latch and the object to which the bolt is applied or supplemental key or detent devices; but these, so far as we know, while in a general way effective do not produce all of the results desired in that the cost thereof and the requirements of adjustment limit their general adoption.

Our invention especially seeks to provide a very simple and inexpensive means for coöperating with keyless pins or bolts of the character before mentioned, which require little or no adjustment in fitting the pin or bolt in place and which will effectively serve to hold the pin or bolt from loose longitudinal movement in its bearing or seat and also prevent the latch member from swinging into such position with the bolt that the said bolt can accidentally leave its bearing or seat and yet admit of as free an adjustment of the latch for setting it to its bolt-removal position as is found in the adjustment of the ordinary type of bolts of this kind, and, furthermore, our invention seeks to provide means adapted to form a coöperative part of a keyless pin or bolt which in its use will avoid the necessity of providing a specially-formed aperture in one of the members of the body to which the pin or bolt is to be applied.

With the above objects in view our invention embodies a bolt or pin of the character described of the peculiar construction and correlation of parts hereinafter fully described in detail, and specifically pointed out in the appended claims, reference being had to the accompanying drawings, in which—

Figure 1 is a perspective view of a pitman connection with our improved bolt or pin forming a part thereof, the parts being in their normal or operative position. Fig. 2 is a similar view of the same, the latch member being shown swung up in full lines in a plane with the slot extension of the aperture in the washer and swung into alinement with the bolt in dotted lines. Fig. 3 is a vertical transverse section of the pitman, taken on a line central of the bolt C. Fig. 4 is an end elevation, the parts being in the position shown in Fig. 2. Fig. 5 is a detail view of the washer. Fig. 6 is a similar view of a slightly-modified form of said washer, hereinafter referred to.

In the accompanying drawings our improved bolt or pin is shown as forming a part of a connection for pitman-rods. It is manifest, however, that the same may be utilized for numerous other purposes.

As shown, the member A of the connection has a forked end, the members $a$ $a'$ of which have apertures $a^x$ $a^x$ in alinement and both made of the cross-sectional shape of the body of the bolt C.

B designates the pitman-rod head, apertured at $b$ for the bolt. The bolt C comprises the usual head 1 and shank or body $1^a$, that extends solid from the head 1 to the outer edge of the member $a'$, from which point it projects a suitable distance and is bifurcated to its outer extremity, as indicated by 1$^b$. Within the bifurcated end is pivotally hung the latch member D, which consists of a flattened shank $d$ of a length approximately the same as the length of the bifurcated extension 1$^c$ of the bolt, and this shank $d$ is fulcrumed on the pivot-pin $d^x$ in such manner that it can be swung into a longitudinal alinement with the bolt-shank and just clear the face of the member $a'$. The shank $d$ merges with an enlarged portion $d^3$, having the same diameter as the body of the bolt, and said portion, with the shank $d$, constitutes the latch or lock member for holding the bolt from endwise movement in its bearing when the washer E, presently referred to, is fitted in place. The end $d^3$ being heavier than the shank $d$, it follows that when the bolt is pushed home and the shank is in a proper position relatively to the opening in the washer E the part $d^3$ will gravitate to a vertical position, and thereby bring the "latch" at right angles to the body of the bolt. By reason of the relative construction of the several parts, as shown and described, it is obvious that when the latch is turned to its locking position, as shown in Fig. 3, a space equal the length of the end of the shank that projects above the bolt exists between the latch and the member $a'$ of part A, and hence loose longitudinal play of the bolt would occur if provision is not made to overcome it. This we accomplish by a peculiar construction of the washer E, which while primarily for taking up any loose longitudinal play of the bolt is also provided for maintaining the latch in such position as to reduce the danger of same swinging into alinement with the body of the bolt during ordinary usage to the minimum. For this purpose the washer E has a thickness equal the space between the part $a'$ and the latch D, and the said washer has a bolt-aperture $e$, adapted, when the washer is in place, to aline with the bolt-apertures in the members $a$ $a'$. The aperture $e$, however, merges with a vertical slot $e'$ in a pendent portion $e^2$ to provide for the proper turning of the latch-shank $d$ up into a plane with the bolt when it (the shank $d$) is turned to the vertical position to register with the slot $e'$, as shown in Figs. 2 and 4. The pendent part $e^2$ also serves the function of a gravity member for maintaining the washer E with its slot $e'$ to its vertical position below the axis of the bolt. While under ordinary circumstances the weighted lower end of the washer will serve to maintain the said washer with its slot end in proper position below the bolt, yet to prevent the said washer turning by reason of frictional contact with the weighted end of the latch we provide the said washer E with a shoulder flange or projection $e^x$ to extend under the lower edge of the member $a'$. This will positively hold the washer from swinging laterally on or with the bolt when the parts are arranged as shown in Fig. 1. When, however, the bolt is used in a position other than horizontal—vertically, for instance—with latch end uppermost to hold the washer from turning on or with the bolt, it in addition to the projection on the slotted end to engage the part $a'$ is also formed with a projection $e^y$ on the upper end, as shown in Fig. 6, whereby to engage the part $a'$ on the opposite sides to prevent lateral swing of the washer E in any direction.

Having thus described our invention, what we claim, and desire to secure by Letters Patent, is—

1. The combination with the connection members A and B, having alining bolt-apertures; of the bolt C having a bifurcated outer end, the latch D having a shank pivotally hung on the said slotted end, and a weighted extremity, and the washer E having a bolt-aperture, a pendent member provided with a slot merging with the bolt-aperture, the inner side of said washer having means projecting over and engaging the member A to prevent it from swinging on or with the bolt, as shown and described.

2. The combination with the parts A and B, and the bolt C, said bolt having a bifurcated extension; of the latch D, pivotally hung on said bifurcated bolt end and having a weighted outer end, adapted to be swung into longitudinal alinement with the bolt, and the washer E apertured to loosely hang on the bolt, said washer having a slotway merging with its bolt-aperture, and having on its inner face projections to engage the opposite edges of the member A, all being arranged substantially as shown and for the purposes described.

E. D. LEVITT.
JOHN W. POLCHOW.

Witnesses:
J. S. LAMONT,
A. PRICE.